(12) United States Patent
Kahn et al.

(10) Patent No.: US 8,560,216 B1
(45) Date of Patent: Oct. 15, 2013

(54) METHOD AND APPARATUS TO PROVIDE GUIDANCE TO A VEHICLE BASED ON VEHICLE CHARACTERISTICS

(75) Inventors: Philippe Kahn, Santa Cruz, CA (US); Arthur Kinsolving, Santa Cruz, CA (US)

(73) Assignee: DP Technologies Inc., Scotts Valley, CA (US)

( * ) Notice: Subject to any disclaimer, the term of this patent is extended or adjusted under 35 U.S.C. 154(b) by 141 days.

(21) Appl. No.: 13/160,439

(22) Filed: Jun. 14, 2011

(51) Int. Cl.
*G06F 19/00* (2011.01)
*G01M 17/00* (2006.01)
*B60Q 1/00* (2006.01)

(52) U.S. Cl.
USPC ........ 701/123; 701/29.1; 340/438; 340/450.2

(58) Field of Classification Search
USPC ........... 701/3, 23, 24, 25, 117, 120, 123, 301, 701/410, 411, 413, 416, 420, 421, 442, 701/533; 342/350, 352, 357.2, 357.21, 342/357.22, 357.24, 357.39, 357.44, 342/357.64, 357.72, 357.73; 340/990, 340/995.23, 995.24
See application file for complete search history.

(56) References Cited

U.S. PATENT DOCUMENTS

| | | | |
|---|---|---|---|
| 2007/0174004 A1* | 7/2007 | Tenzer et al. | 701/123 |
| 2009/0005974 A1* | 1/2009 | Lenneman et al. | 701/209 |
| 2009/0099724 A1* | 4/2009 | Kranz et al. | 701/35 |
| 2010/0010732 A1* | 1/2010 | Hartman | 701/200 |
| 2010/0063717 A1* | 3/2010 | Proefke et al. | 701/123 |
| 2010/0088012 A1* | 4/2010 | O'Sullivan et al. | 701/200 |
| 2011/0112719 A1* | 5/2011 | Marumoto et al. | 701/35 |
| 2012/0053825 A1 | 3/2012 | Schunder | |

OTHER PUBLICATIONS

PCT/US12/40603, International Search Report and Written Opinion, Mailed Aug. 27, 2012, 14 pages.

* cited by examiner

*Primary Examiner* — Thomas Black
*Assistant Examiner* — Tyler Paige
(74) *Attorney, Agent, or Firm* — Blakely, Sokoloff, Taylor & Zafman LLP; Judith A. Szepesi

(57) ABSTRACT

A method or apparatus to provide customized guidance to a vehicle having a consumption pattern, such that the guidance takes into account the consumption pattern of the vehicle.

20 Claims, 13 Drawing Sheets

METHOD AND APPARATUS TO PROVIDE GUIDANCE TO A VEHICLE BASED ON VEHICLE CHARACTERISTICS

FIELD OF THE INVENTION

The present invention relates to vehicle guidance, and more particularly to customize vehicle guidance based on vehicle characteristics.

BACKGROUND

Global Positioning System (GPS) is a satellite based navigation system that provides positioning, navigation, and timing services to worldwide users on a continuous basis. GPS is made up of three parts: orbiting satellites, control and monitoring stations, and GPS receivers. A GPS receiver obtains signals from at least two GPS satellites to calculate three-dimensional location (latitude, longitude, and altitude) plus the time.

GPS is becoming more popular. GPS receivers designed to be mounted in cars and boats are common. In addition to such dedicated GPS receivers, GPS is becoming available for mobile devices that have the capability of receiving GPS signals and calculating the location data.

SUMMARY

A method or apparatus to provide customized guidance to a vehicle having a consumption pattern, such that the guidance takes into account the consumption pattern of the vehicle.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
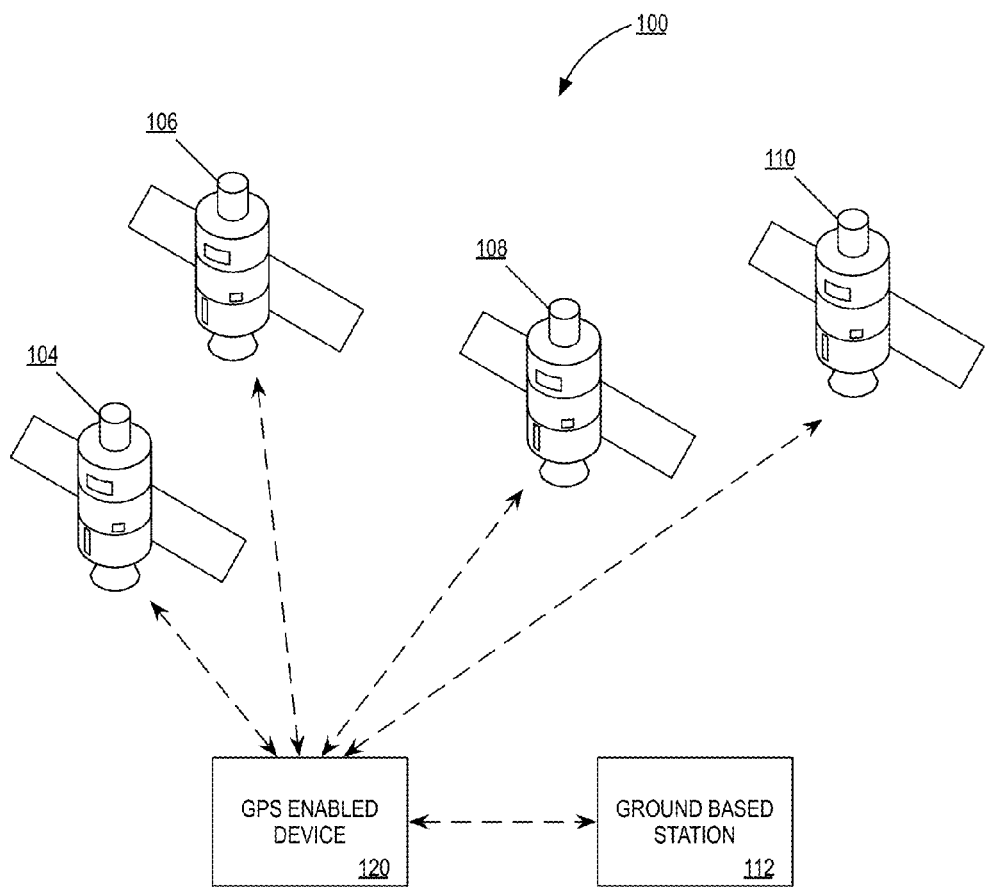
FIG. 1A is an overview figure showing GPS-based navigation for a vehicle.

The method and apparatus described is a guidance system including vehicle characterization. General guidance systems, based on GPS or other information, may be used to provide directions to guide a vehicle from a starting point to a destination. In general, existing guidance systems determine the route solely based on the shortest route between the starting point and destination. However, as vehicles with alternative powertrains or multiple powertrains are being introduced, the simple shortest path may no longer be an optimal path for a vehicle. For example, hybrid drive cars are more fuel efficient on city streets than at highway speeds. In contrast, gasoline or bio-fuel based cars are more efficient at higher speeds with fewer stops and starts. Therefore, the guidance system in one embodiment determines the routing based on the vehicle characteristics, route characteristics, and user preferences.

Vehicles that may be available now or become available in the future range from traditional gasoline-based vehicles, bio-diesel vehicles, hybrid vehicles, electric vehicles, to vehicles having a combination of these drive trains. Alternative drive trains may also become available. However, in general, all vehicles require fuel, whether that be biofuel, electricity, gasoline, natural gas, hydrogen, or some alternative. The term "fuel" as used here refers to whatever refillable energy source is used, while fueling station refers to a location where such fuel may be obtained. This may encompass materials not generally thought of as fuel, e.g. solar power (in which case a solar array would be an appropriate fueling station), hydrogen, etc.

While gas stations are commonly found along most routes, alternative fueling stations may be difficult to find. Therefore, the present invention further provides guidance to ensure that the vehicle reaches a fueling station at appropriate intervals. In one embodiment, in addition to characterizing the vehicle, and the route, the system may further characterize the driver's style. For example, rapid acceleration and deceleration utilizes more fuel than a slow start and coasting to a stop. Therefore, the range of the vehicle may be influenced by the driver's driving style in addition to the vehicle drive train and route. Note that the term "route" may encompass one or more of: elevation, traffic, weather, road wear, and other factors that may influence the travel experience and fuel consumption.

In the below specification the term "car" may be used to describe the vehicle being guided. It should be understood that this is merely one example of the type of vehicle, which may be guided. The guidance system of the present invention may be applicable to powered vehicles of all types, cars, trucks, tractors, boats, airplanes, etc. Similarly, the term "user" or "driver" is used. However, this may apply to an automated driver, as well as a human driver.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

FIG. 1A is an overview figure showing GPS-based navigation for a vehicle. The system 100 includes a global positioning system (GPS) enabled device 120 that receives GPS signals from a plurality of GPS satellites, such as satellites 104, 106, 108, 110, and/or one or more ground based GPS signal sources, such as GPS signal source 112.

GPS enabled device 120 utilizes the GPS signals to triangulate its position in a manner well known in the art. The GPS enabled device 120 may be a handheld GPS device (e.g., a GPS enabled cellular phone, PDA, etc.), a GPS enabled navigation device (e.g., a TOMTOM™, GARMIN™, MAGELLAN™ or other navigation system), a mobile system such as a smart phone including a GPS receiver, a self-navigating vehicle, or other device which utilizes GPS data for location determination.

In one embodiment, GPS enabled device 120 utilizes three or more signals (from satellites 104, 106, and 108, for example) to determine a longitude and latitude of GPS enabled device's current location. In another embodiment, GPS enabled device 120 utilizes four satellite signals (from satellites 104, 106, 108, and 112 for example) to determine a longitude, latitude, and altitude of GPS enabled device's current location. In one embodiment, GPS enabled device 120 makes successive location calculations to determine additional information, such as, for example, GPS enabled device's speed, bearing, track, trip distance, route, etc. The GPS enabled device 120 may use a mapping function in conjunction with the location data from the GPS signals.

As will be discussed in greater detail below, in one embodiment, GPS enabled device 120 includes one or more inertial sensors, such as accelerometers and gyroscopes (not shown). The inertial sensors allow GPS enabled device 120 to calculate a location based on sensor data. The location determination based on the GPS satellite signals, may then be supplemented by the inertial sensor based calculation, in one embodiment. The GPS enabled device 120 can then use the inertial sensor based data to continue monitoring the device location, when the GPS signal is not available. In one embodiment, the device 120 may further include mechanisms that allow it to determine its location based on cellular tower triangulation, wireless network address data, or other information. In one embodiment, the system described in co-pending patent application U.S. Ser. No. 12/684,881, filed on Jan. 8, 2010, may be used.

Figure 1B:
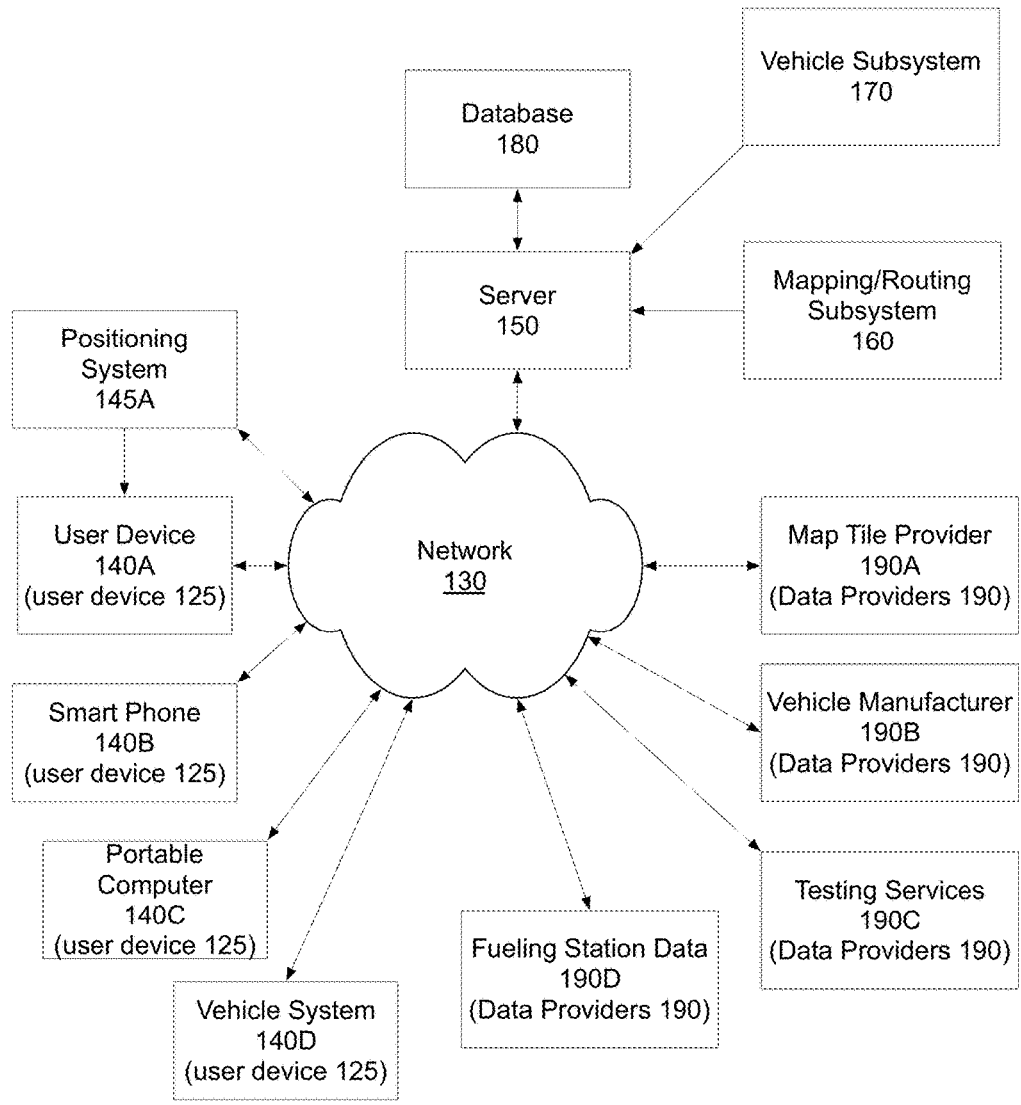
FIG. 1B is a network diagram of embodiments of the system.

FIG. 1B is a network diagram of embodiments of the system. The system includes at least one user device 125, which may be a smart phone 140B, a portable computer 140C, a vehicle system 140D, or a non-location aware device 140A coupled with a positioning system 145A. In one embodiment, the user device may be coupled to a network 130, through which data may be obtained. For example, there may be third party data providers 190. Third party providers 190, for example, may include vehicle manufacturers 190B, governmental or non-governmental testing services 190C, etc. Third party providers 190 may also include a database of the location and availability of various refueling stations 190D. For example, there are currently websites that track the location, hours, and capacity of hydrogen fueling stations.

In one embodiment, the user device 120 may be coupled to server 150 via a network 130. Note that while the generic term "network" is used, the network 130 may be a wireless network, a satellite based network, a cellular network, or any other system that enables the user device 125 to connect to outside systems. In one embodiment, the user device 125 may connect to the network 130 indirectly, through a server device or other device.

The server 150 may include a mapping/routing subsystem 160 can provide the routing data for the user's device. In another embodiment, the mapping/routing may take place on the user device 120. In one embodiment, the responsibility for mapping and routing may be split between the user device 120 and the server 150. The mapping/routing subsystem 160 may obtain map tile data from a third party data provider 190A.

The server 150 may include a vehicle subsystem 170 which can be used to characterize a vehicle. The characterization identifies features such as type of drive train, type of fuel, fuel consumption on various roads, etc. In one embodiment, the vehicle subsystem 170 may obtain data from multiple user devices 120, and over time build a more realistic statistical description of vehicle behavior based on real-world data. This statistical description may be stored in a database 180, such as vehicle database 180. The vehicle database 180 may be used as the baseline characterization for subsequent vehicles of the same type. The vehicle database 180 may be made available to third parties, such as government entities, vehicle manufacturers, etc. In one embodiment, the aggregate data may be made available in various ways.

Figure 2:
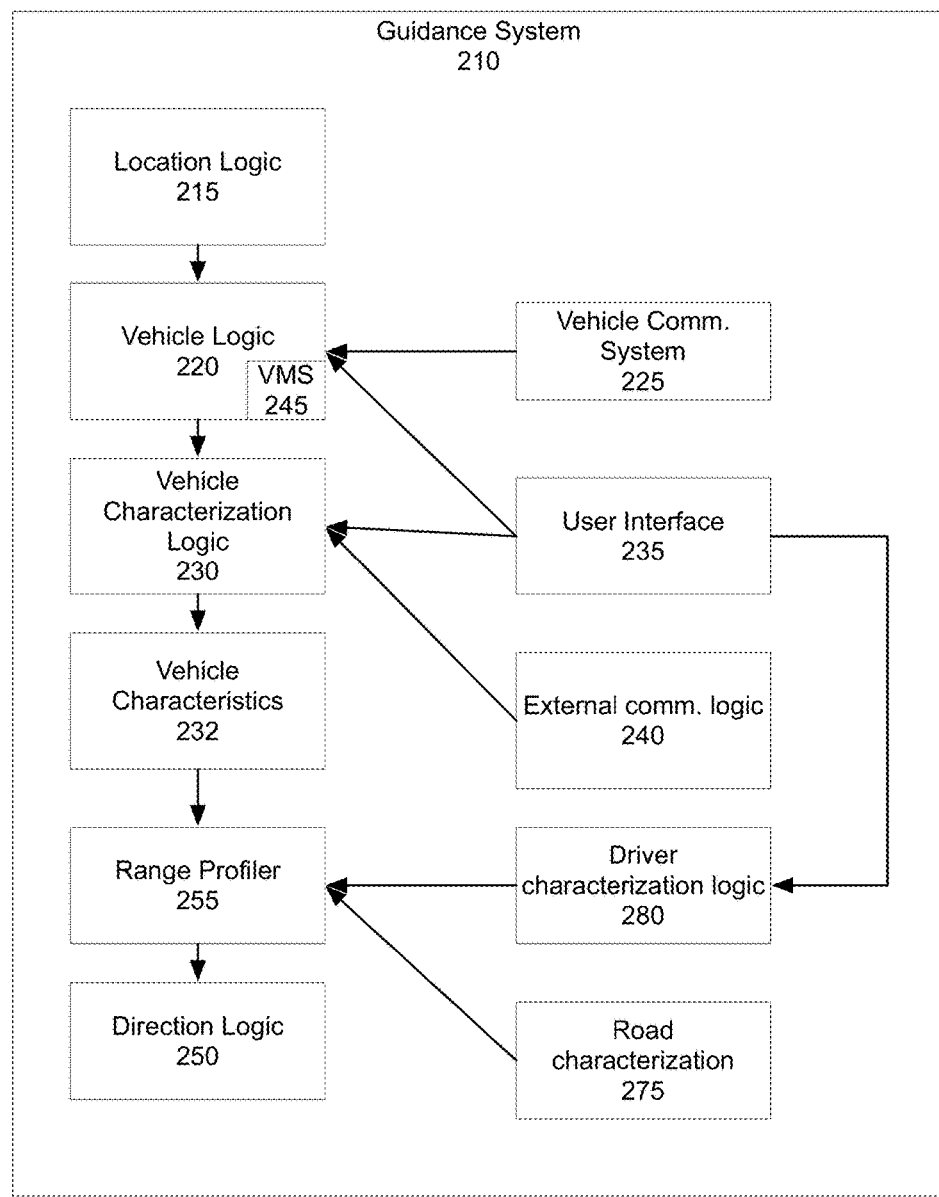
FIG. 2 is a block diagram of one embodiment of the guidance system.

FIG. 2 is a block diagram of one embodiment of the guidance system. The guidance system 210 may be part of a GPS-enabled mobile device, a server, or split between a GPS-enabled mobile device and a server. The GPS enabled mobile device may be a vehicle including the processor, memory, and logics described below, a smart phone, a dedicated GPS device, or another system that may be associated with a vehicle, that can provide location information.

The guidance system 210 receives location data from one or more sources, at location logic 215. These sources may include one or more of: a GPS receiver, an accelerometer, a gyroscope, another type of inertial sensor, a network connection logic which detects location based on wireless networks, a cellular connection logic which detects location based on cellular signals, E911 location data, or cellular towers, assisted GPS, or another source or combination of sources that may be used to identify the user's current location.

The location logic 215 is within a device that may or may not provide the processing capabilities for the system described below. In one embodiment, the device itself simply provides location data and communication ability, while the actual processing takes place at a server, or a separate device that may be local to the device (e.g. the GPS receiver may be built into a vehicle, while the processing may take place on a smart phone device coupled to the vehicle. Alternatively the GPS/location logic 215 may be within a mobile device, such as a GPS receiver, while the processing may take place on a separate device, which may be a mobile device.

Guidance system 210 includes a vehicle communication system 225 to obtain data from a vehicle, in one embodiment. Communication system 225 may include a method to interface to the vehicle's communication system. As devices are getting smarter, smart vehicles are starting to communicate internal status data. This communication can be tapped into by communication system 225. The information may include the vehicle's characteristic data such as make, model, specifications, as well as current status data such as remaining fuel, tire pressure, oil filter status, etc.

Guidance system 210 further includes, in one embodiment, a user interface 235. The user interface 235 enables the system to get data from the user. In one embodiment, whatever data is not directly available from the vehicle is obtained from the user. In one embodiment, the user is permitted to add data. In one embodiment, the user added data is verified with the information received directly from the vehicle. In one embodiment, if there are any significant discrepancies between the data provided by the user and the vehicle, the user is alerted via user interface 235.

The system may further include external communication logic 240, to obtain information from an external source. In one embodiment, the external data may be vehicle data, and external source may be a database of vehicle characterizations. In one embodiment, the external source may be the manufacturer's site, a governmental or non-governmental testing group's site, a wiki, or one or more other data sources. In one embodiment, the external data is current route characteristic data, e.g. weather, traffic conditions, etc. In one embodiment, the external data is real-time data about road conditions.

The system also includes a vehicle logic 220, which receives vehicle characteristic data from vehicle communication system 225. Vehicle characterization logic 230 sets the characteristics used by direction logic 250, to account for distance traveled, fuel consumption, etc. Vehicle characterization logic 230 generates vehicle characteristics 232 associated with each vehicle that the guidance system is used with. The vehicle characteristic 232 is used by direction logic 250.

Vehicle logic 220 may in one embodiment further include a vehicle monitoring system. The vehicle monitoring system 245 monitors the vehicle data, as received from vehicle communication system 225 and user interface 235. In one embodiment, vehicle monitoring system 245 may include a plurality of sensors which can be used to obtain data. For example, an accelerometer may be used to monitor how long a vehicle is at a charging station, acceleration patterns, stop and go traffic, etc.

Vehicle monitoring system 220 is used to update the vehicle characteristics 232 associated with a particular vehicle. In one embodiment, the guidance system is associated with one or more vehicles, each of which is characterized. At its most basic, the characterization consists of receiving a vehicle selection from the user. The vehicle characterization includes information about the drive train, and fuel system used by the vehicle. At its most complex, the characterization may directly receive data from the vehicle and may include everything from engine temperature to tire pressure, or other characteristics.

In addition to characterizing the vehicle, the system may characterize the driver as well. Acceleration and deceleration, average speed, shifting characteristics on manual transmissions, and other factors controlled by the driver may influence the vehicle's performance. Therefore, in one embodiment, driver characterization logic 280 attempts to characterize a driver. Driver characterization data may be received from the driver, e.g. by requesting user preferences for acceleration/ deceleration/etc. In one embodiment, driver characterization data may be derived from data received from various sensors or communications systems. For example, shifting data may be received from the vehicle monitoring system 245, and acceleration and deceleration data may be received from the vehicle monitoring system 245 or an accelerometer or other inertial sensor in the system.

Direction logic 250 uses mapping data to create a route for the vehicle, on request from the user. The mapping data includes road condition information, in one embodiment. Road conditions may include permanent features and transitory features. Permanent road features may include: incline, stop signs, stop lights, speed limits, etc. Transitory features may include traffic levels, accidents, weather conditions, etc. In one embodiment, road condition information is obtained and/or calculated by route characterization logic 275. In one embodiment, permanent features may be stored, while transitory features are obtained on a per-occasion basis from a server.

The user requests routing through user interface 235. Routing takes into account all of the relevant characteristics that make up the range profile of the vehicle. The range profile, generated by range profiler 255, includes one or more of: vehicle characterization (vehicle characteristics 232), fuel status (vehicle monitoring system 245), road conditions (route characterization logic 275), and user characteristics (driver characterization logic 280).

Figures 3A, 3B:
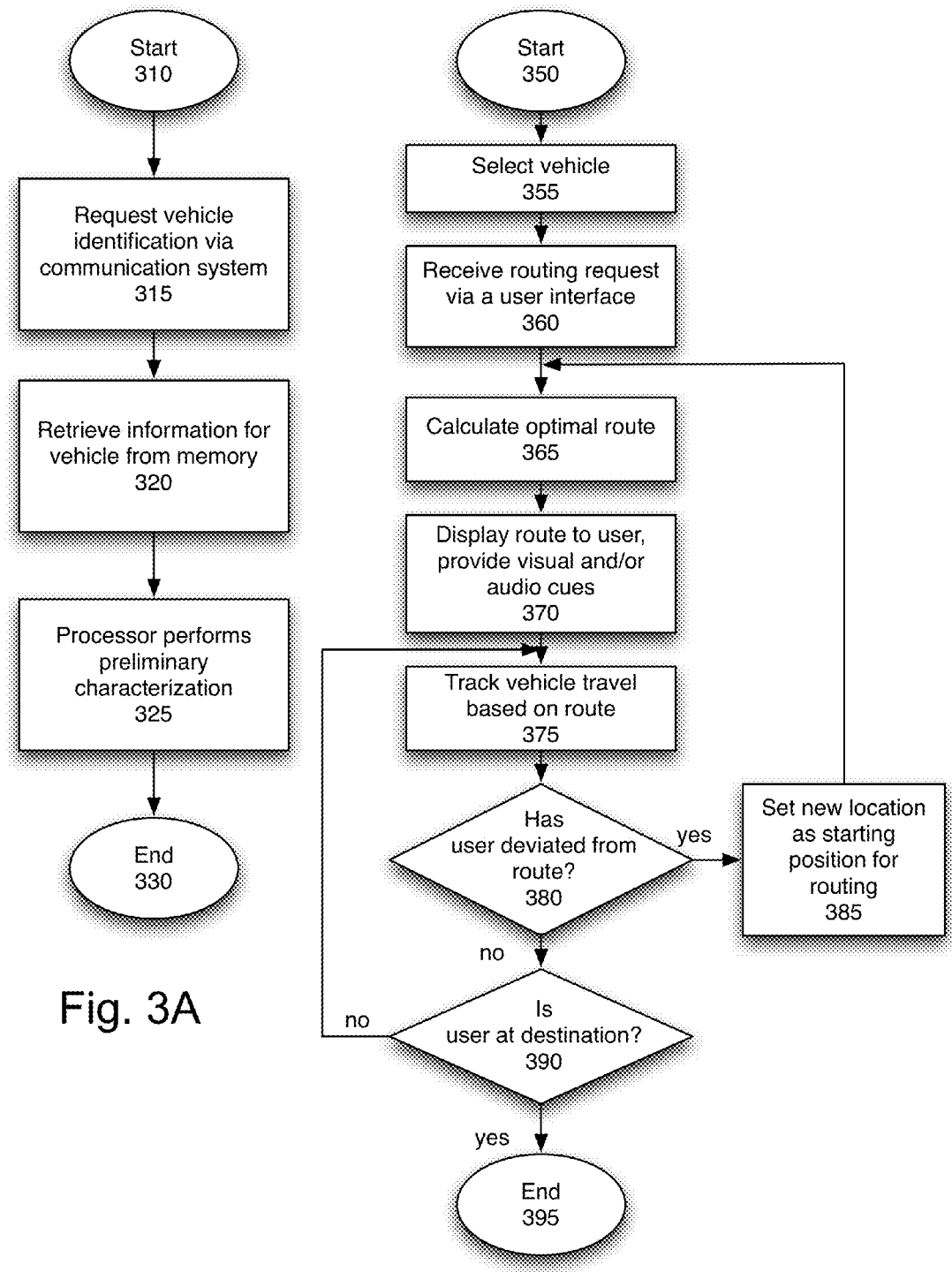
FIG. 3A is an overview flowchart of one embodiment of setting up the system.
FIG. 3B is an overview flowchart of one embodiment of using the system.

FIG. 3A is an overview flowchart of one embodiment of the initial set-up of the system. The process starts at block 310. In one embodiment, this process starts when the user selects the "configure device for vehicle." In one embodiment, this may be done the first time the user wishes to utilize the routing system with a new vehicle.

At block 315, the vehicle identification is requested. In one embodiment, the user is asked to identify the vehicle. In one embodiment, this may be done from a pull-down menu. In one embodiment, the user may enter custom information, e.g. when the car has a non-standard configuration. For example, users convert Toyota Prius hybrid vehicles to electric-only vehicles. The option to characterize the vehicle as a custom vehicle is provided, in one embodiment. In on embodiment, if the vehicle is not a custom vehicle, the user may select from a list of available vehicle configurations. In one embodiment, the vehicle identification may be obtained based on a photograph. In one embodiment, the photograph may be of the vehicle. In one embodiment a photograph of the VIN number or the license plate may be used, along with registration information available from third party sources, to identify the vehicle.

At block 320, the system retrieves information regarding the vehicle identified. In one embodiment, if the vehicle is a custom vehicle, the information retrieved is the relevant information about the characteristics provided, e.g. if the vehicle is a bio-diesel vehicle with a 12 gallon tank, the system retrieves data about the capacity of 12 gallons of bio-diesel, the drive characteristics of bio-diesel vehicles, and the weight changes associated with such a conversion.

At block 325, a preliminary characterization of the vehicle is determined. This preliminary characterization may include features such as the number of miles/kilometers the vehicle can travel prior to having to refuel; the fuel consumption characteristics based various factors such as speed, acceleration/deceleration, road conditions, traffic levels, etc. The process then ends at block 330.

FIG. 3B is the overview characteristic of system use. This process starts at block 350, when the user initiates the system. At block 355, the vehicle is selected. In one embodiment, if only one vehicle is characterized it is automatically selected, and shown to the user. In one embodiment, the user may add a custom image, e.g. their vehicle, for this user interface feature. If multiple vehicles are characterized, the user is prompted to select the vehicle.

At block 360, a routing request is received. In one embodiment, this may occur prior to the identification of the vehicle. The routing request indicates a destination and an origin. The origin may be the system's current location.

At block 365, the system calculates an optimal route, based on the origin, destination, vehicle characterization, and current conditions. The optimal route may include one or more places where the vehicle can be refueled. The optimal route may not be the shortest route, but is the route, which is the most efficient path.

At block 370, the route is displayed to the user. Audio cues for turns may be provided to the user.

At block 375, the system tracks the travel of the vehicle, based on the route, and at block 380 the process determines whether the user has deviated from the route. If the user deviates from the route, at block 385, the new location is set as the origin and the process returns to block 365 to calculate a new optimal route, based on the location of the user.

At block 390, the process determines whether the user has reached his or her destination. If so, the process ends at block 395. Otherwise, the process continues to block 370, to continue displaying the route to the user.

Figure 4:
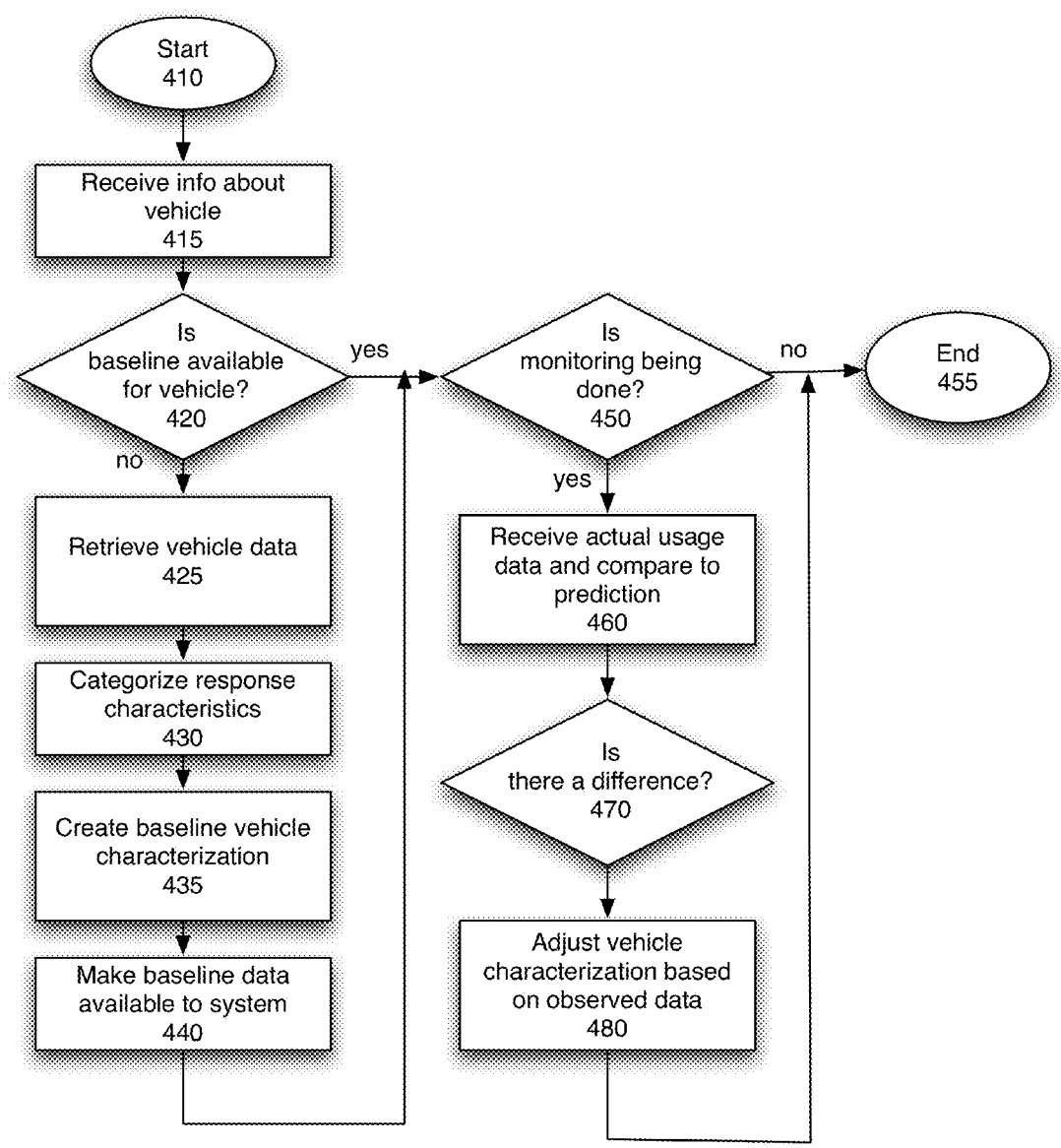
FIG. 4 is a flowchart of one embodiment of characterizing the vehicle.

FIG. 4 is a flowchart of one embodiment of range characterization\. The process starts at block 410. At block 415, the process receives information about a vehicle. This information may include the type(s) of powertrain, the capacity (for fuel or energy sources), weight, and any other relevant information available about the vehicle. In one embodiment, the user may select the vehicle brand and configuration (e.g. 2011 TOYOTA® PRIUS® III). The vehicle identification may be used to receive information about the vehicle from one or more sources. These sources may include an internal database, based on observed behaviors of such vehicles, the manufacturer's data, testing data by third parties including government entities, etc.

At block 420, the process determines whether baseline characterization information is already available for this configuration. In one embodiment, each vehicle specifics are characterized once. For example, a TOYOTA® PRIUS® with certain configuration details would be characterized once. After that, a subsequent PRIUS® with the same configuration would not have to be separately analyzed for the baseline characterization. If a baseline characterization is available, the process continues directly to block 440.

If no characterization is available, at block 425, the process retrieves data about the vehicle, including curb weight, shape, identified powertrain(s), etc. The data may be retrieved from third party sites such as the Environmental Protection Agency (EPA), the National Transportation Safety Board (NTSB), Consumer Reports™, US Department of Energy (www.fueleconomy.gov), the manufacturer's site, technical journals, and/or other sources.

At block 430, in one embodiment the response characteristics are broken up into categories. These categories may be based on speed, acceleration and deceleration, incline, and a combination of these categories. Other categorizations may also be used. In one embodiment, additional variables may also be considered. Other variables may include ambient temperature, humidity, elevation, road conditions, etc.

At block 435, the vehicle characterization is created. The characterization describes the vehicle's expected behavior, in terms of fuel consumption and potentially other characteristics, based on the categories as noted above. This characterization is stored locally, for future uses of the same vehicle, in one embodiment. The characterization may also be stored in a server, to make it available to others.

At block 440, the vehicle characterization is made available to the system. The system uses this characterization in determining the range profile of the vehicle, and based on the range profile, optimally routing the user.

Figure 5:
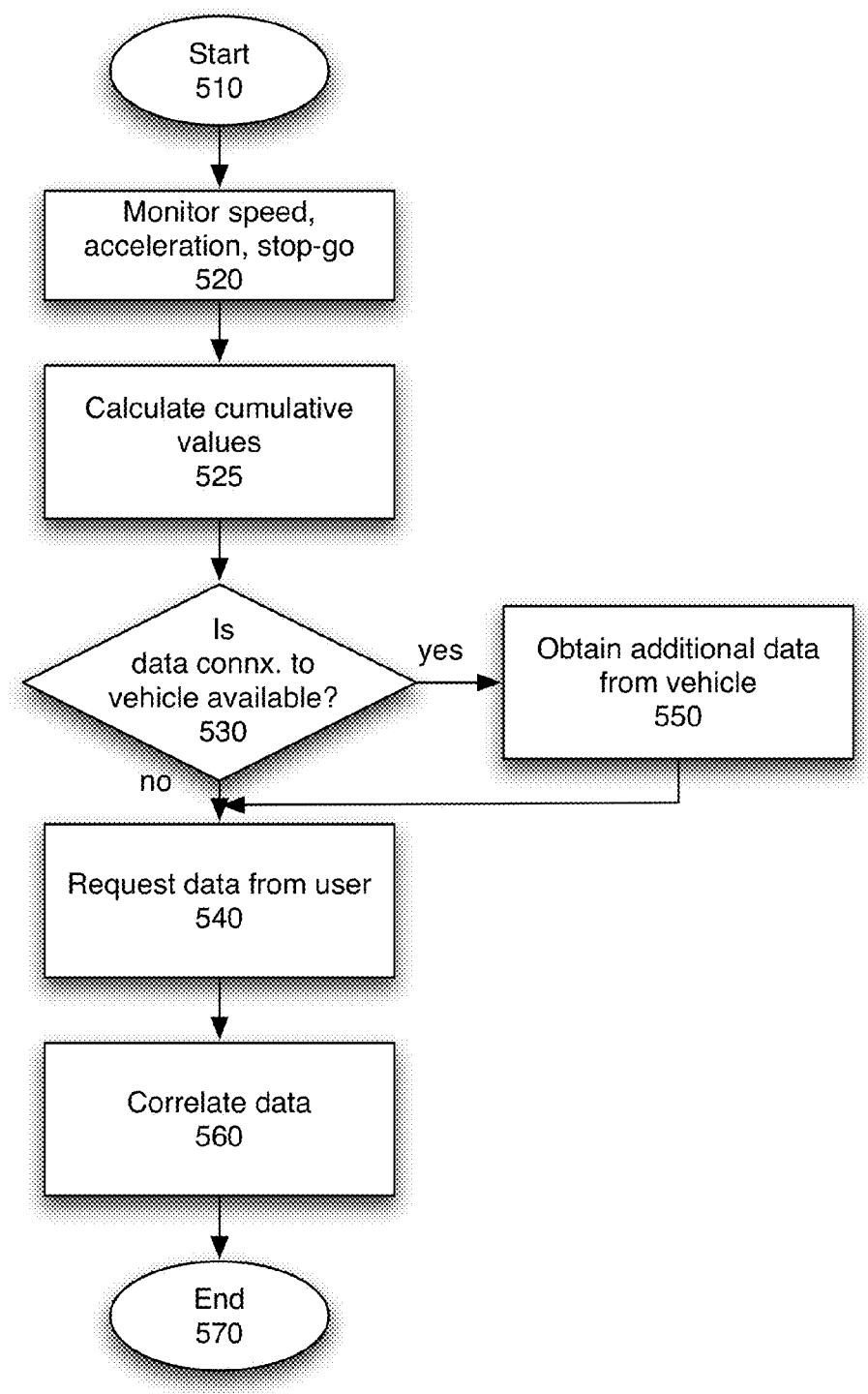
FIG. 5 is a flowchart of one embodiment of monitoring actual usage patterns to adjust vehicle characterization.

In one embodiment, the vehicle characterization may be updated based on actual usage data. In one embodiment, the process determines at block 450 whether monitoring is being done. In one embodiment, monitoring requires certain sensors and information from the system. FIG. 5 describes one embodiment of the details of monitoring. In one embodiment, if monitoring is available, the process continues to block 460. If no monitoring is available, the process ends at block 455.

At block 460, the system receives the actual usage data and a comparison is made between the predicted range profile, based on the vehicle characterization and other characterization data, and the actual data obtained from monitoring the system.

At block 470, the process determines if there are differences between the prediction and the actual data. In one embodiment, a difference is defined as a sufficiently large difference for quantification. In another embodiment, the difference may be any delta consistently observed over multiple observation periods. In another embodiment, other standards may be sent to identify a difference. If there is no difference, the evaluation ends at block 455.

If a difference is observed, the process continues to block 480. At block 480, the characterization is adjusted based on observed data. The characterizations adjusted may include user and vehicle specific characterization. The process then ends at block 455.

In one embodiment, if a particular vehicle's characterization is consistently altered in the same way, e.g. the system observes that despite the characterization provided by the manufacturer, the actual vehicle consumption pattern is different, the system may update the default vehicle characterization based on this data. In one embodiment, this data may also be shared with other entities including, in one embodiment, government agencies, reviewers, and the manufacturer.

FIG. 5 is a flowchart of one embodiment of monitoring actual usage patterns to adjust vehicle characterization. The process starts at block 510. In one embodiment, the monitoring process runs continuously when the vehicle is in use. In another embodiment, the monitoring may connect to a vehicle at the end of a trip and obtain monitoring data from the vehicle.

At block 520, the system monitors average speed, acceleration, incline, as well as stop-go. In one embodiment, this is done using one or more of: a global positioning system (GPS), accelerometer, gyroscope, or other sensor array within the system. Stop-go evaluates the length, speed, and frequency of accelerations and decelerations, which is a more useful statistic than highway v. city, since highways can have traffic jams, and cities can have well timed lights.

The monitoring of real data may be done continuously, and whenever the system is active. In another embodiment, this may be done on a polling basis, e.g. occasionally to spot-check results. In another embodiment, this may be done when guidance is requested, and used. The below steps, in contrast, are evaluation steps.

In one embodiment, the system evaluates how accurate the vehicle characterization-based numbers are. In one embodiment, the evaluation is performed periodically. In one embodiment, the evaluation is performed more frequently initially, before the user's pattern has been observed. In one embodiment, after the characterization has been validated/updated once, the evaluation is performed less frequently. For example, in one embodiment, initially the evaluation is performed daily, then weekly, and after a period monthly or even less frequently.

At block 525, the system uses the collected data to calculate cumulative values. In one embodiment, the sensor collects information continuously. Cumulative values represent the values over time. In one embodiment, cumulative acceleration may be calculated per trip, per day, etc. In one embodiment, the cumulative values for acceleration may include differentiating between acceleration from zero to 20 mph (e.g. initial acceleration) and from 20 mph to higher. Other, or alternative speed-based divisions may be used. Potentially other divisions may also be observed. This can be useful in part because for hybrid vehicles the electrical engine powers the initial acceleration, while acceleration above a certain speed is powered by a gasoline engine. Of course, the particular divisions vary. In one embodiment, the particular divisions may depend on the vehicle specification. Furthermore, a particular driver may have the habit of firmly stepping on the gas when starting from a standstill but accelerating more sedately otherwise. Thus, these types of characterizations are useful in determining the likely consumption pattern of the vehicle, regardless of the powertrain.

At block 530, the system determines whether connection to the vehicle directly is possible. The system may communicate with a vehicle via a private area network, local area network, Bluetooth, wireless network connection, being directly connected via wire, or other connection.

If no such connection is possible, at block 540 in one embodiment, the system requests additional data from the user. Certain information, e.g. accelerant consumption is not available to the system. This information may be requested from the user. In one embodiment, the user may be provided with the opportunity to add additional data as well. The process then continues to block 560.

If such a connection is possible, the process continues to block 550, and information is obtained from the vehicle. In one embodiment, if there is a connection between the system and the vehicle, the system may further obtain additional data, e.g. wheel rotations, wheel pressure, acceleration data, etc. that is available from the vehicle's own data collection. In one embodiment, this data is obtained from a server, to which the vehicle uploads its data. That is, the connection between the system and the vehicle need not be a direct connection. The process then continues to block 560.

At block 560, the entered or calculated data, and the collected data are correlated. In one embodiment, correlation includes adding the data to the appropriate records. In one embodiment, correlation further includes the reconciliation of data, if there are discrepancies between the monitored data and the received data. In one embodiment, the vehicle's own data is considered the most accurate. In one embodiment, if there is a conflict between the user entered data and the calculated data, the user may be asked to confirm their data, and the confirmed user data is considered more accurate than the calculated data. The process then ends, at block 570.

Figure 6:
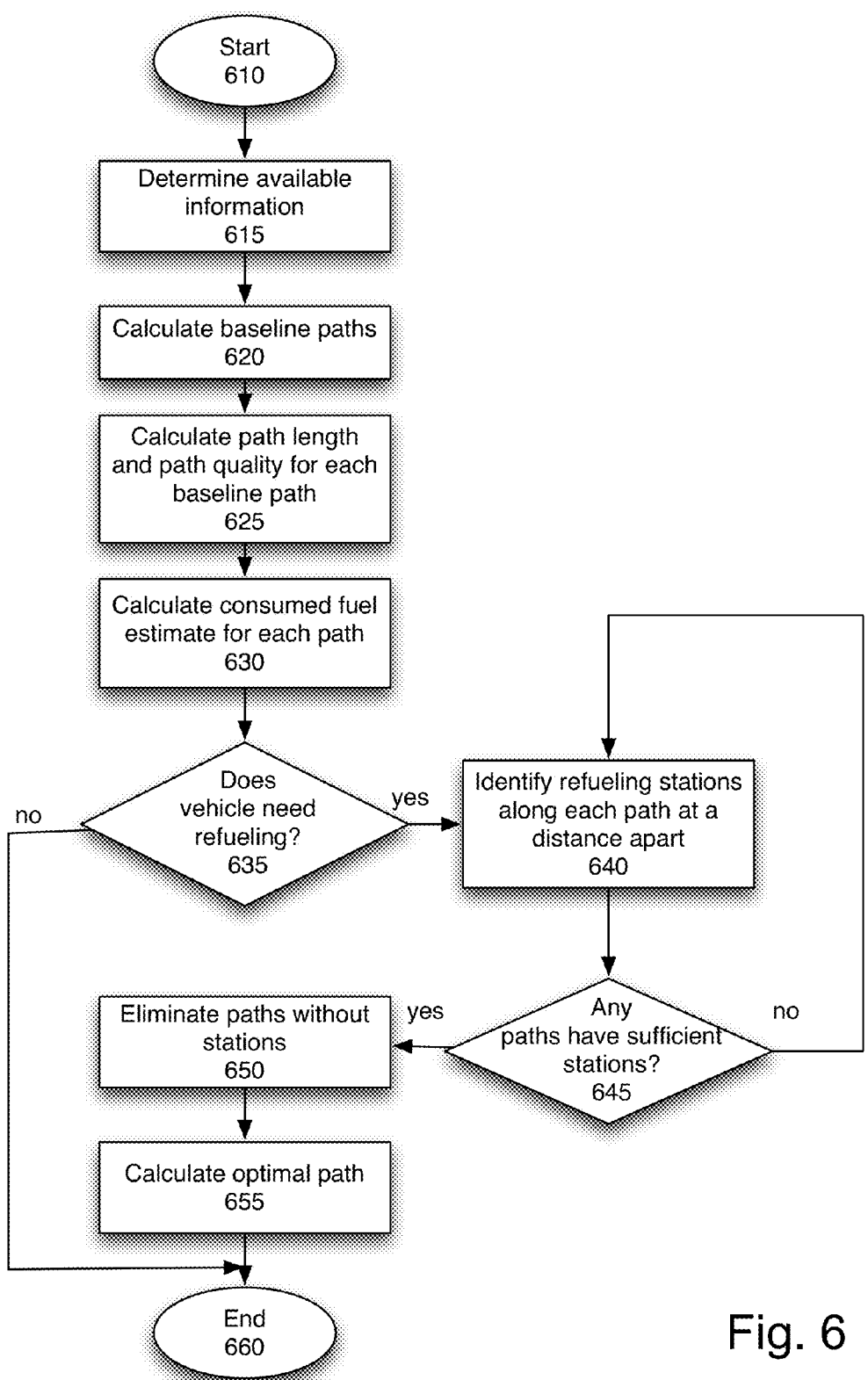
FIG. 6 is a flowchart of one embodiment of route analysis including refueling option analysis.

FIG. 6 is a flowchart of one embodiment of range analysis including refueling option analysis, based on a range profile. The process, in one embodiment, occurs when a user requests directions from a starting point to an end point. The process starts at block 610.

At block 615, the process determines what information it has about the vehicle's current status. This may be obtained from the vehicle, as described above, or based on prior information.

At block 620, the process calculates one or more baseline paths, leading from starting point to the ending point. The baseline path provides a general route. In one embodiment, the baseline path may include a plurality of paths between the starting point and the ending point. The system then uses the baseline paths, to select/calculate the optimal path.

At block 625, the system calculates path length and path quality for each of the baseline paths. Path quality evaluates the inclines and traffic conditions. At block 630, the path length and quality, and the vehicle and user characterization data, is used to calculate a consumed fuel estimate for each baseline path.

At block 635, the process determines whether the vehicle needs refueling during the trip. In one embodiment, this is based on the vehicle information, obtained at block 615. In one embodiment, this may be based on the length of the path. In one embodiment the base assumption is that the vehicle is tank/energy store is half full, if no other information is available. If the vehicle will need refueling, the process continues to block 640. Otherwise, the process continues directly to block 655.

At block 640, the refueling stations available along each of the baseline paths are identified. In one embodiment, a refueling station is considered available if it is within a pre-set distance of the path. In one embodiment, the path is classified as having refueling stations only if the refueling stations are appropriately spaced for refueling. For example, an 800 mile path that has refueling stations only in the last 100 miles is not considered to be a path that has refueling stations available, even if there are three stations in that last 100 mile path.

In one embodiment, the portions of a path between two refueling stations are called a path segment. Each path segment has a maximum length, based on the projected distance the vehicle can travel between refueling stops. One embodiment of the projected distance calculation is described below. In one embodiment, a user may set the path segment length, based on a level of fuel consumption he or she is comfortable with. For example, many users do not wish to run down their battery or fuel levels to below a quarter tank. In that instance, the path segment length would be calculated based on this preference.

At block 645, the process determines whether any of the paths have refueling stations available. If none of the paths have refueling stations available, the process returns to block 640, with an extended pre-set distance for refueling stations. If one or more paths have refueling stations, the process continues to block 650.

At block 650, those paths that do not have refueling stations appropriately spaced are eliminated. In one embodiment, the paths that do have refueling stations are adjusted, for actual length in view of any detours needed for reaching refueling stations. In one embodiment, if the path change is more than a percentage of the length of the path segment, the process returns to block 620. One or more baseline paths are calculated, with the relevant refueling station designated as an intermediate destination.

At block 655, the process calculates an optimal path based on the remaining baseline paths. The optimal path the shortest path with the lowest fuel consumption. In one embodiment, "shortest path" is based on shortest time, rather than shortest distance. The evaluation of the "lowest fuel consumption" is based on the known data about the vehicle, driver, path, and any other relevant characteristics. In one embodiment, if there is no path that is both shortest and has the lowest fuel consumption, the combined best path is the one where the time & fuel consumption combination is lowest. In one embodiment, the lower fuel consumption path is preferred, if the paths are otherwise equal. The process then ends, at block 660.

Figure 7:
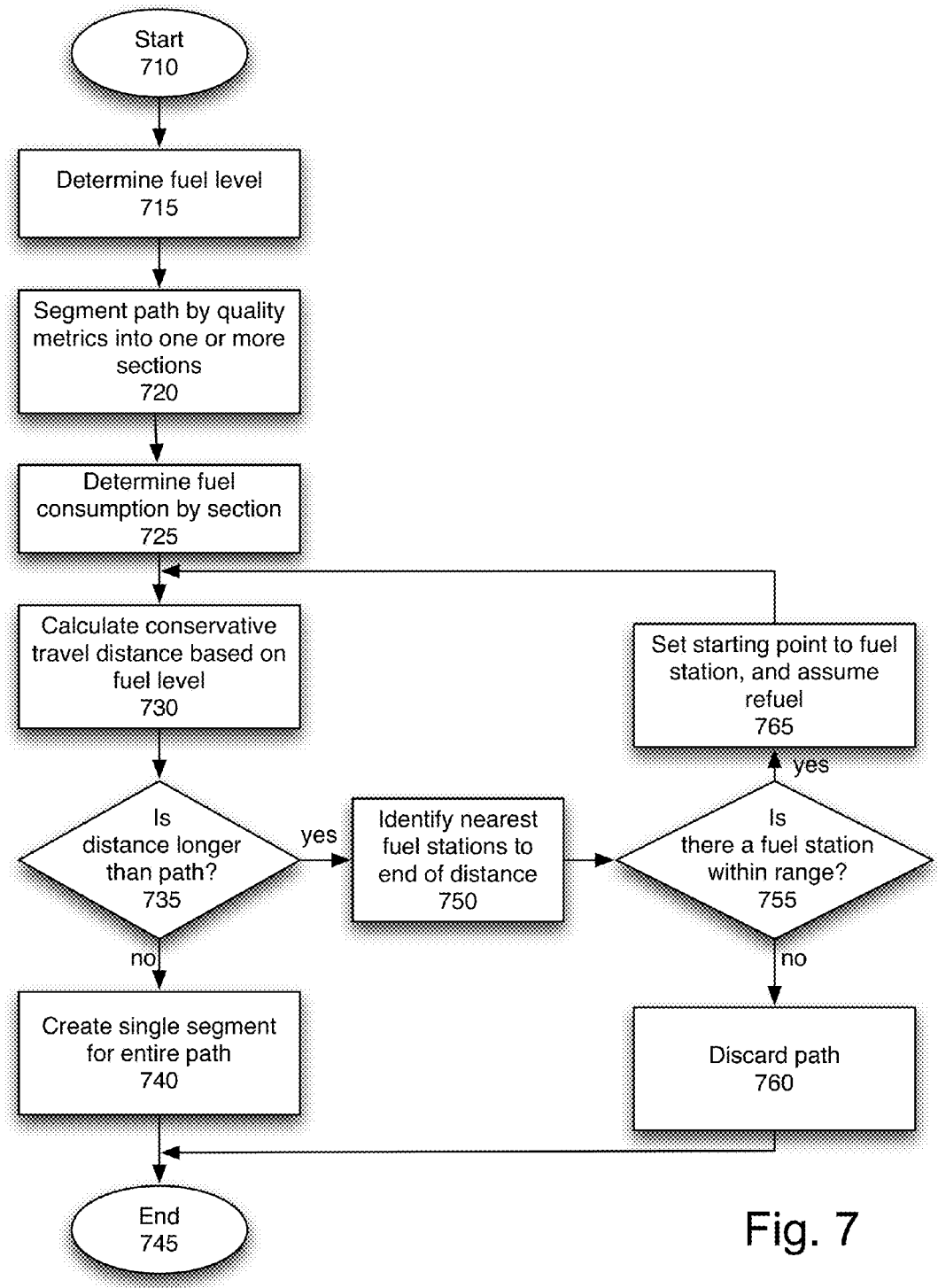
FIG. 7 is a flowchart of one embodiment of predictive capacity evaluation.

FIG. 7 is a flowchart of one embodiment of predictive capacity evaluation. Predictive capacity evaluation estimates the distance between refueling stops. Predictive capacity evaluation evaluates a distance that the vehicle can travel between refueling stops, based on the range profile and path characteristics. In one embodiment, this corresponds to the calculation referenced above with respect to FIG. 6 in block 635. The process starts at block 710.

At block 715, the process determines the current fuel level. In one embodiment, this data is obtained from the user. In one embodiment, the system initially requests a fuel level from the user, and then tracks fuel consumption based on sensor data. In one embodiment, if vehicle communication is established, the vehicle may provide the fuel level directly.

At block 720, the paths for routing are segmented into one or more sections, based on quality metrics. Quality metrics define the road characteristics, e.g. incline, traffic level, etc. In one embodiment, the minimum quality metrics are the length of the road and type or road (e.g. freeway, city street, etc.) In one embodiment, quality metrics may further include weather-based adjustments to the road characteristics.

At block 725, the estimated fuel consumption by section is obtained. By sectioning the path into sections, which share quality metrics, the system can assume that the fuel consumption across an entire section will be constant.

At block 730, a conservative maximum distance to refueling is calculated based on current fuel level, and range profile/road conditions. In one embodiment, the conservativeness of the evaluation may be based on user preferences.

At block 735, the process determines whether the distance is longer than the path. This indicates that the vehicle must be refueled at least once during the route. If the distance is not longer than the path, a single segment is created for the entire path, at block 740, and the process then ends.

If the distance is longer than the path, the nearest fuel station to the end of the distance is identified, at block 750.

At block 755, the process determines whether there is a fuel station within range. In one embodiment, the term "within rage" means that the fuel station is sufficiently near the end of the distance that the user can travel to it. In one embodiment, this distance may be defined by the user, or may be the smallest distance available, when evaluating all paths. In one embodiment, if there is no fuel station near the end of the path segment, the system may adjust the search, to search further back along the path, since the user can easily stop earlier. If there is no fuel station even after adjustment, the path is discarded at block 760.

If there is a fuel station within range, the process continues to block 765. At block 765, the fuel level is set to "refueled" starting from the fueling station. In one embodiment, the fuel level may be set to full. In one embodiment, the fuel level may be set based on the speed of refueling. In one embodiment, the user may set a preference to reduce that, if the user is not interested in filling up fully. This may especially be relevant when the fueling process is a slower charging process, e.g. the user may not want to stop for two hours to fully charge an electric vehicle.

The process then returns to block 730, to calculate a conservative travel distance based on the fuel level, starting from the fueling station.

If there is no fuel station within range, at block 755, the path is discarded. In one embodiment, this only occurs if there is no fueling station along the second half of the path. The process then ends at block 745. The process thus segments the path into multiple smaller sections, and enables the routing. In one embodiment, the routing calculation may include accounting for time spent at refueling. For example, a user may be directed to a nearby coffee shop or restaurant, or timing may be adjusted to enable the user to take a lunch or dinner, while a vehicle is being refueled. This may be especially useful if the refueling is slow, e.g. current electric engines may requires 1-2 hours to fully recharge. In one embodiment, if multiple fuel stops are available along a path, a fuel stop with better entertainment options may be preferentially selected. In one embodiment, the user's preferences may be taken into account. For example, the user may indicate a preference for Starbucks® Coffee Shops. In that case, in one embodiment, the system may preferentially schedule fuel stops that feature the coffee shops.

Figure 8:
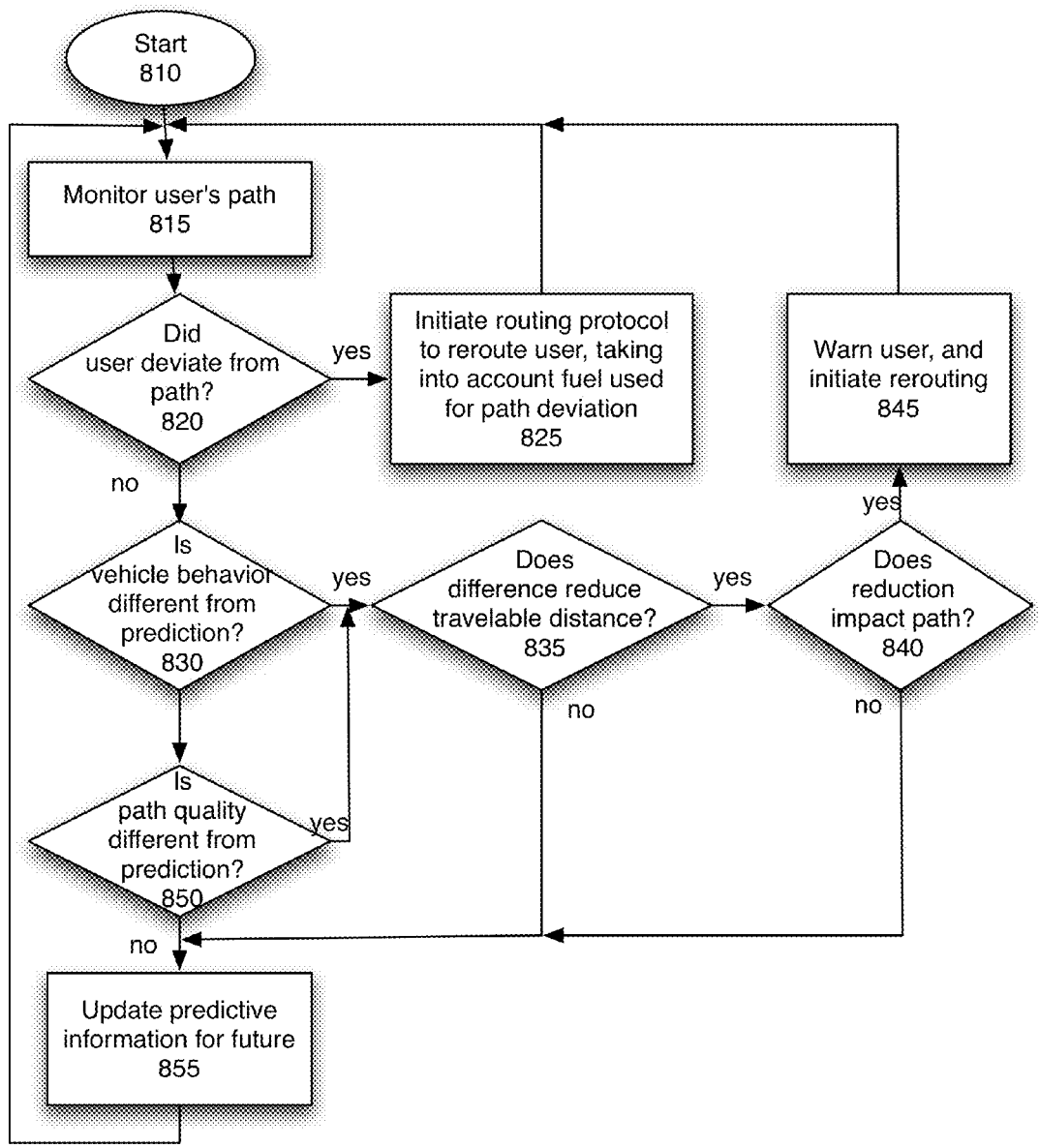
FIG. 8 is a flowchart of one embodiment of rerouting based on behavior and predictive analysis.
Figure 9A:
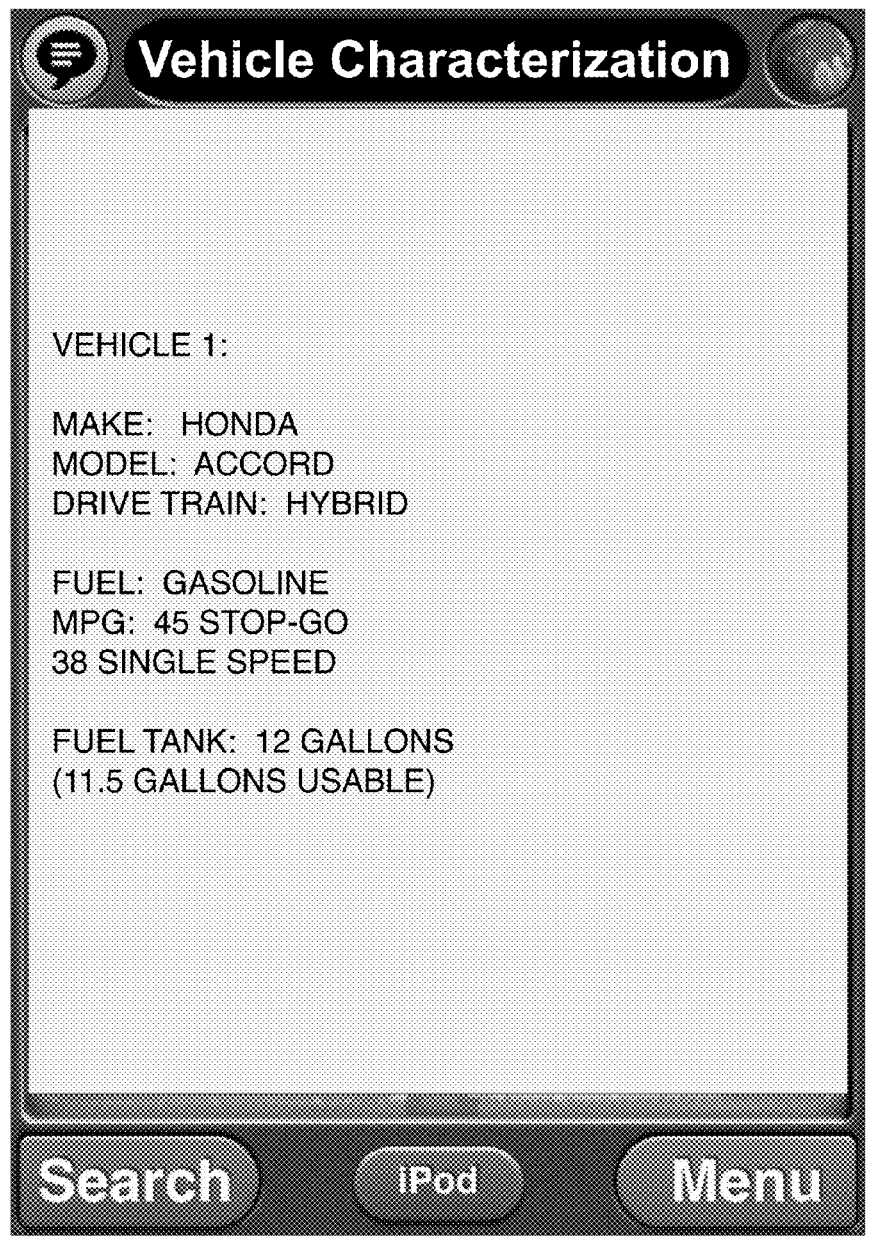
FIGS. 9A-9C are exemplary user interface figures for vehicle characterization, user preferences, and routing.
Figure 9B:
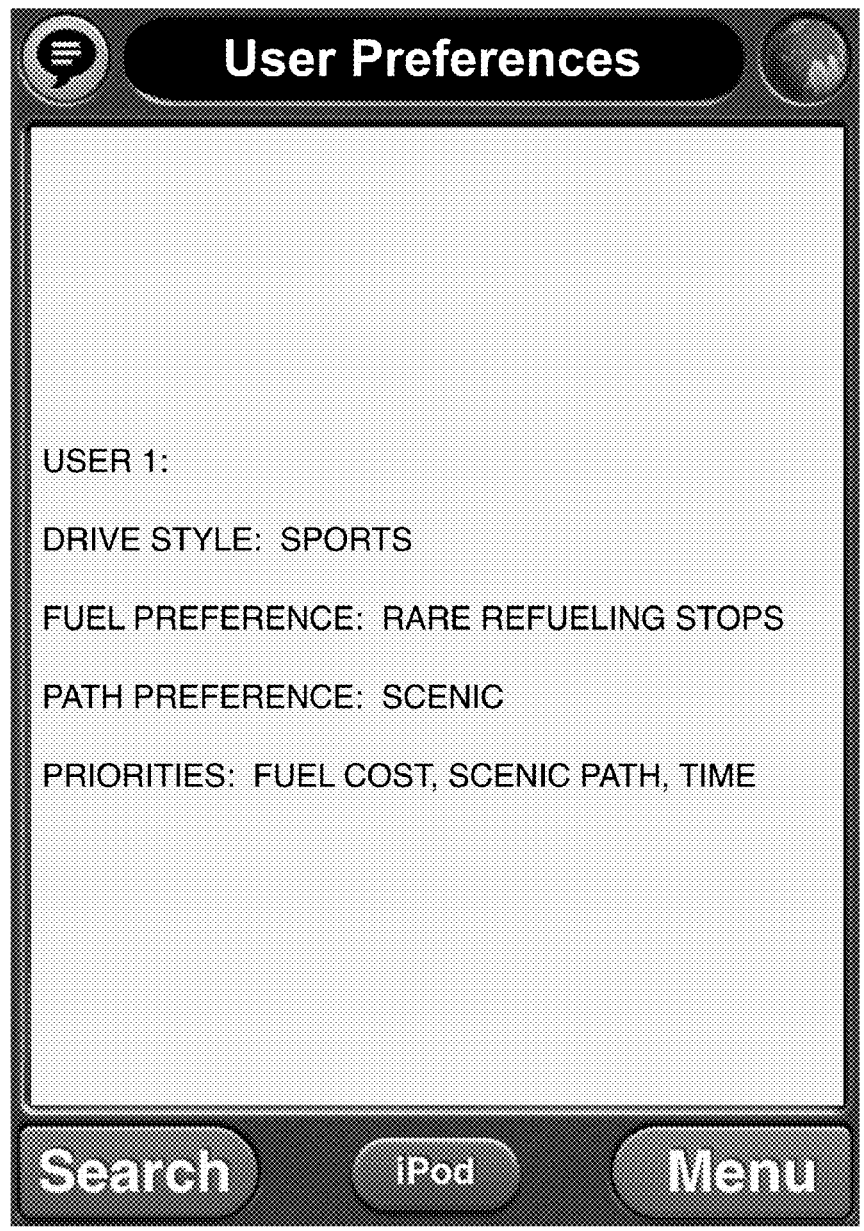
Figure 9C:

FIG. 8 is a flowchart of one embodiment of rerouting based on behavior, predictive analysis, and/or observed data. The process starts at block 810. At block 815, the system monitors the user's path. The system may continuously monitor the user's path, even when no routing is taking place. This is useful to be able to estimate fuel consumption, as well as driver characteristics.

At block 820, the process determines whether the user has deviated from the path. If so, at block 825, the process initiates rerouting, taking into account the fuel used in the path deviation. In some cases, this may be significant, e.g. the user may need to be routed to a different fueling stop.

If the user did not deviate from the path, as determined at block 820, the process continues to block 830. At block 830 the process determines whether the vehicle behavior is different from the prediction. The vehicle behavior may include one or more of: fuel consumption, acceleration/deceleration, tire pressure, or any other data which was used in range profile calculations. Vehicle behavior may include driver behavior as well, e.g. faster acceleration and more aggressive braking change the fuel consumption of the vehicle.

If the vehicle behavior is different, the process at block 835 determines whether the differences reduce or increase the travelable distance. If so, the process at block 840 determines whether the reduction impacts the path. The path would be impacted if an earlier refueling may be necessary, or a refueling stop may be skipped. If so, at block 845, the user is warned and the system initiates rerouting. If the reduction does not impact the path, the process continues to block 855, and the predictive information is updated for future use. In this way, over time the system will achieve excellent predictive abilities. The process then returns to block 815, to continue monitoring the user's path.

If the vehicle behavior is not different, at block 850 the process determines whether the path quality is different from the prediction. Path quality may include incline level, wind level, traffic level, etc. If so, the process continues to block 835, to determine whether the travelable distance has been changed. If the path quality is not different, the process continues to block 855, to update the predictive information. The process then returns to block 815 to continue monitoring the user's path.

Figure 10:
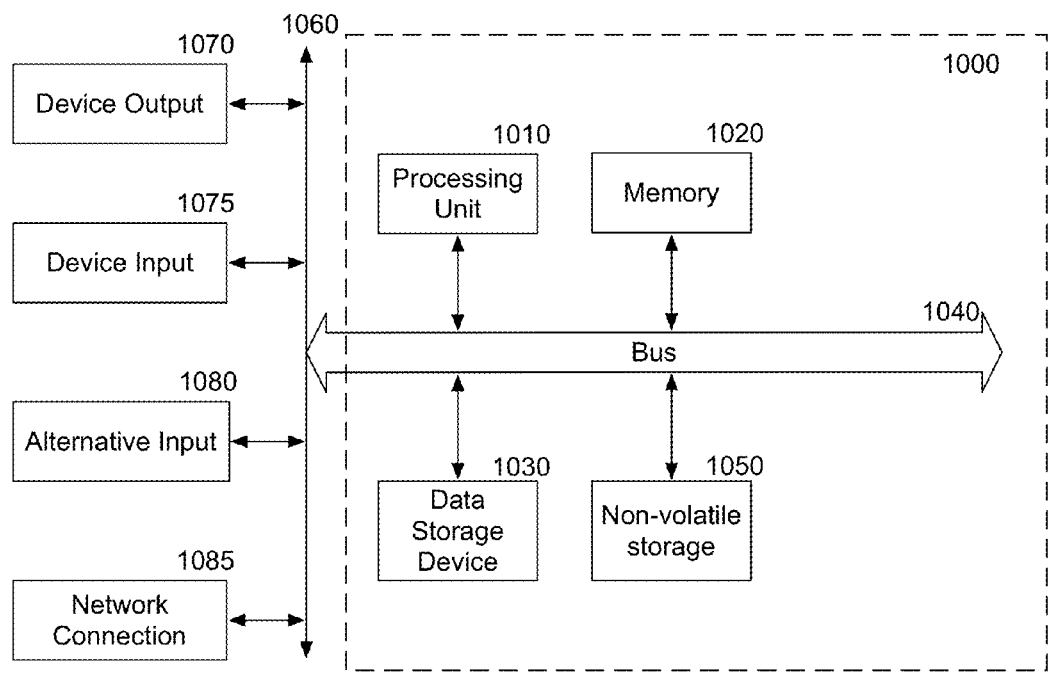
FIG. 10 is a block diagram of one embodiment of a specific computing system that may be used with the present invention.

FIG. 10 is a block diagram of a particular machine, which may be used with the present invention. It will be apparent to those of ordinary skill in the art, however that other alternative systems of various system architectures may also be used.

The data processing system illustrated in FIG. 10 includes a bus or other internal communication means 1040 for communicating information, and a processing unit 1010 coupled to the bus 1040 for processing information. The processing unit 1010 may be a central processing unit (CPU), a digital signal processor (DSP), or another type of processing unit 1010.

The system further includes, in one embodiment, a random access memory (RAM) or other volatile storage device 1020 (referred to as memory), coupled to bus 1040 for storing information and instructions to be executed by processor 1010. Main memory 1020 may also be used for storing temporary variables or other intermediate information during execution of instructions by processing unit 1010.

The system also comprises in one embodiment a read only memory (ROM) 1050 and/or static storage device 1050 coupled to bus 1040 for storing static information and instructions for processor 1010. In one embodiment the system also includes a data storage device 1030 such as a magnetic disk or optical disk and its corresponding disk drive, or Flash memory or other storage that is capable of storing data when no power is supplied to the system. Data storage device 1030 in one embodiment is coupled to bus 1040 for storing information and instructions.

The system may further be coupled to an output device 1070, such as a cathode ray tube (CRT) or a liquid crystal display (LCD) coupled to bus 1040 through bus 1060 for outputting information. The output device 1070 may be a visual output device, an audio output device, and/or tactile output device (e.g. vibrations, etc.)

An input device 1075 may be coupled to the bus 1060. The input device 1075 may be an alphanumeric input device, such as a keyboard including alphanumeric and other keys, for enabling a user to communicate information and command selections to processing unit 1010. An additional user input device 1080 may further be included. One such user input device 1080 is cursor control device 1080, such as a mouse, a trackball, stylus, cursor direction keys, or touch screen, may be coupled to bus 1040 through bus 1060 for communicating direction information and command selections to processing unit 1010, and for controlling movement on display device 1070.

Another device, which may optionally be coupled to computer system 1000, is a network device 1085 for accessing other nodes of a distributed system via a network. The communication device 1085 may include any of a number of commercially available networking peripheral devices such as those used for coupling to an Ethernet, token ring, Internet, or wide area network, personal area network, wireless network or other method of accessing other devices. The communication device 1085 may further be a null-modem connection, or any other mechanism that provides connectivity between the computer system 1000 and the outside world.

Note that any or all of the components of this system illustrated in FIG. 10 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 1020, mass storage device 1030, or other storage medium locally or remotely accessible to processor 1010.

It will be apparent to those of ordinary skill in the art that the system, method, and process described herein can be implemented as software stored in main memory 1020 or read only memory 1050 and executed by processor 1010. This control logic or software may also be resident on an article of manufacture comprising a non-transitory computer readable medium having computer readable program code embodied therein and being readable by the mass storage device 1030 and for causing the processor 1010 to operate in accordance with the methods and teachings herein.

The present invention may also be embodied in a handheld or portable device containing a subset of the computer hardware components described above. For example, the handheld device may be configured to contain only the bus 1015, the processor 1010, and memory 1050 and/or 1025.

The handheld device may be configured to include a set of buttons or input signaling components with which a user may select from a set of available options. These could be considered input device #1 1075 or input device #2 1080. The handheld device may also be configured to include an output device 1070 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processing unit 1010, a data storage device 1030, a bus 1040, and memory 1020, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1085.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1010. A machine-readable medium includes any mechanism for storing information in a form readable by a machine (e.g. a computer). For example, a machine-readable medium includes read-only memory (ROM), random access memory (RAM), magnetic disk storage media, optical storage media, flash memory devices, or other storage media that may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   performing an initial characterization of a vehicle, including fuel requirements;
   predictively evaluating a range profile of the vehicle using the initial characterization using a computing system including a processor;
   adjusting the initial vehicle characterization based on data obtained from vehicle use;
   generating a route based on the adjusted characterization of the vehicle, such that the route includes routing to a refueling station having an appropriate fuel type, when the distance the vehicle can travel prior to the refueling is less than the length of the route.

2. The method of claim 1, wherein the initial characterizing comprises:
   determining a vehicle type based on one or more of: user input, data received from the vehicle, a photograph of the vehicle.

3. The method of claim 2, wherein the characterizing further comprises:
   adjusting the vehicle characterization beyond the vehicle type, based on further input.

4. The method of claim 2, wherein the characterizing further comprises obtaining data regarding the vehicle from external sources.

5. The method of claim 1, wherein the adjusting comprises:
tracking the vehicle during use to generate observed data; and
adjusting the vehicle characterization based on the observed data.

6. The method of claim 1, further comprising:
wherein the routing takes into account permanent road conditions, including one or more of: incline, stop signs, stop lights, and speed limits.

7. The method of claim 6, wherein the routing takes into account transitory road conditions which include one or more of: traffic level, accidents, weather conditions.

8. The method of claim 1, further comprising:
automatically characterizing a driver, based on behavior, such that the vehicle characteristics are modified by the driver characteristics, the modified characteristics used for predictively evaluating the range profile of the vehicle and for routing.

9. An apparatus comprising:
a vehicle characterization logic to initially characterize a vehicle, including fuel requirements;
the vehicle characterization logic to update the initial characterization based on data obtained during vehicle use;
a range profiler to use the characterization data to predictively evaluate a range profile of the vehicle;
a direction logic to generate a route based on the characterization of the vehicle, such that the route includes routing to a refueling station having an appropriate fuel type, when the distance the vehicle can travel prior to the refueling is less than the length of the route as determined based on the range profile.

10. The apparatus of claim 9, wherein characterizing comprises:
a vehicle logic to determining a vehicle type, based on one or more of: user input, data received from the vehicle, a photograph of the vehicle.

11. The apparatus of claim 10, wherein the vehicle characterization logic adjusts the vehicle characterization beyond the vehicle type, based on further input.

12. The apparatus of claim 10, wherein the characterizing further comprises obtaining data regarding the vehicle from external sources.

13. The apparatus of claim 9, further comprising:
a vehicle monitoring logic to generate observed data based on vehicle tracking information; and
the vehicle characterization logic altering the vehicle characterization based on the observed data.

14. The apparatus of claim 9, wherein the range profiler further includes one or more of a road characterization and a driver characterization.

15. The apparatus of claim 14, wherein a driver characterization logic characterizes a driver, based on user input data regarding driver preferences and driver behavior, which may include: aggressiveness of acceleration deceleration, engine revving.

16. A mobile device including a system to provide guidance to a vehicle comprising:
a vehicle system to communicate with the vehicle, and obtain information from the vehicle;
a vehicle characterization logic to initially characterize the vehicle, to determine factors which may have an effect on a range profile, the range profile including fuel consumption based on route characteristics, thereby enabling the use of the same mobile device with multiple vehicles;
the vehicle characterization logic to update the initial characterization of the vehicle based on observed conditions and to adjust the range profile; and
a direction logic to generate directions taking into account the range profile of the vehicle and the route characteristics of potential routes.

17. The system of claim 16, further comprising:
a driver characterization logic to obtain driver characteristic data used to adjust the range profile.

18. The system of claim 16, further comprising:
a road characterization logic to obtain road characteristic data used to adjust the range profile.

19. The system of claim 16, wherein the range profile comprises a combination of: current vehicle condition, vehicle characterization, road characterization, and driver characterization.

20. The system of claim 19, wherein the data is obtained from one or more of: a user, an external source, the vehicle, and observed data.

* * * * *